————————————————————————

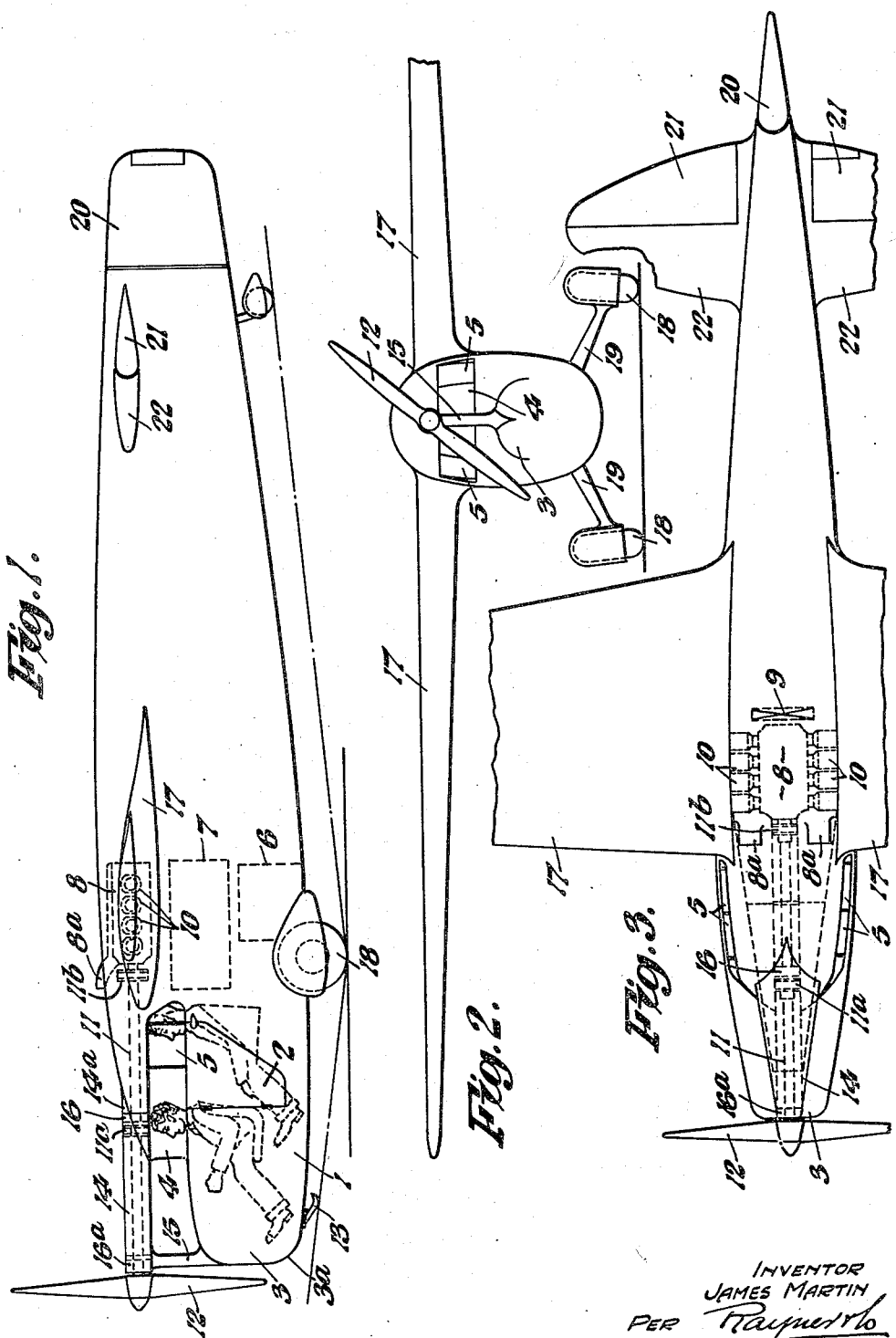

UNITED STATES PATENT OFFICE 2,070,086

AEROPLANE

James Martin, Higher Denham, near Uxbridge, England

Application February 17, 1936, Serial No. 64,304
In Great Britain February 18, 1935

2 Claims. (Cl. 244—55)

This invention comprises improvements in and relating to aeroplanes and has for its object to provide an arrangement and construction which will enable an unrestricted passenger or load carrying cabin or compartment to be placed low down in the fuselage of the machine making it readily accessible and permitting passengers to enter or alight directly from or on to the ground if desired, whereby if required an aeroplane representing the aerial equivalent of the present day private motor car can be obtained in a practical manner. Further objects are to isolate the passengers as far as possible from the noise and fumes of the power unit, to provide good visibility for pilot and passengers and to prevent overturning of the machine or damage to the propeller by the machine being tipped up on its nose through violent application of brakes to its landing wheels or for other reasons.

According to this invention the passenger or load carrying compartment is arranged low down in the body of the aeroplane whilst the engine is arranged above the level of the compartment and preferably substantially over the centre of gravity of the aeroplane. The engine drives a tractor propeller arranged at the front of the aeroplane through a propeller shaft extending between the engine and the propeller above the level of the passenger or load carrying compartment and enclosed in a tubular housing which merges in streamline continuity into the top of the front end of the fuselage. If desired more than one propelling unit comprising engine, propeller and connecting propeller shaft may be arranged side by side but above the level of the passenger or load carrying compartment.

In order that my invention may be clearly understood and readily carried into effect I have appended hereto a sheet of drawing illustrating an embodiment thereof as applied to a monoplane, and wherein:—

Fig. 1 is a side elevation view.
Fig. 2 a front elevation view thereof, and
Fig. 3 a broken plan view.

Referring to the drawing the compartment or cabin 1 for the pilot and passengers is arranged in the front of the fuselage or frame of the aeroplane and low down so that the floor of the compartment will be close to the ground when the aeroplane is resting thereon. One or more openings may be provided in one or both sides of the compartment. These openings are preferably provided with doors one of which is indicated by the reference numeral 2. Both the openings and their doors are preferably shaped to correspond to the spaces between the frame members or bracings of the fuselage. The openings preferably extend down close to the floor of the compartment and may be narrower toward the lower end as shown in Fig. 1. The doors would correspond to this shape. The pilot and passengers will thus be able to enter the compartment direct from the ground and may step out onto the ground without assistance or special landing stages or steps. The lower portion of the compartment may extend forward of the upper portion in the form of a nose 3 in which, e. g. the pilot's controls and leg room can be provided. The upper front part of the fuselage may be provided with a windscreen or windows 4 at the front and windows 5 may extend along both sides so as to afford clear vision all round.

Suitable seats are arranged in the compartment for the pilot and passengers, and disposed so that they may readily see through the windows.

Behind the passenger carrying compartment and preferably approximately on the longitudinal centre of gravity of the machine are located the fuel tank 6 and if desired a suitable luggage compartment 7. Over these and above the level of the passenger carrying compartment is arranged the engine or power unit 8. This may be located in a special sound insulating engine compartment having air scoops 8a or openings with louvres or ducts through which air may circulate to and around the engine to feed the carburettors and for cooling purposes.

If desired a suitable fan or blower 9 may be employed and driven by the engine to assist the circulation of air for cooling the engine. The engine may conveniently be of the horizontal double-opposed type having any convenient number of cylinders 10 disposed on opposite sides of the crankshaft which is arranged substantially parallel with the axis of the aeroplane. Any other suitable type of engine may be employed if desired. From the forward end of the crankshaft or from any reducing gear, if such is employed, a propeller driving shaft 11 extends to the front of the fuselage. The propeller 12 is thus located right in the front of the machine and at such a height as to give an exceptionally good ground clearance. As the forward lower portion or nose 3 of the passenger compartment extends close up to the propeller and as shown is lower than the track of the propeller tip, it is possible by providing a suitable skid below the forward end of the compartment, to prevent damage to the propeller if the machine be tilted on to its nose by a bad landing, rough ground or sudden application of the brakes to its landing wheels. For this purpose a skid 13 is located beneath the nose 3 and it is preferred to locate this skid at approximately the junction of the lower curved front corner 3a of the nose and the base of the fuselage to ensure the free end of the skid making contact with the ground.

The driving shaft, connecting the propeller to the engine is supported in suitable bearings in a tubular housing 14 of light sheet metal suitably strengthened or a skeleton frame enclosed with fabric or other sheet material. The forward end of this tube or housing is supported by a strut or upright frame 15 extending upwardly from the forward upper corner of the nose 3 forming the lower portion of the passenger compartment. The driving shaft 11 is preferably in two sections connected by a flexible coupling 11a and a flexible coupling 11b may also be arranged between the shaft and the engine. A bearing 16 which may be of roller or other anti-friction type is provided for the shaft 11 approximately mid-way between its ends and this bearing is preferably of a self-aligning type. A suitable thrust bearing 16a is provided at the forward end of the shaft close to the propeller. The bearing 16a can be mounted at the junction of the strut 15 and tubular housing 14.

The outer shape of the fuselage or its covering shell is preferably substantially eliptical or egg shape in section and tapers to a thin upright section, corresponding to and in line with the rudder. In this way the fuselage shape merges into the rudder and drag is reduced to a minimum.

The aeroplane is as shown preferably of the high-wing monoplane type, the wings 17 being located behind the passenger carrying compartment and approximately in line with the upper edges of the windows therein and will thus permit a wide angle of view above, below and to the rear; whilst the forward view is totally unobstructed. If desired a series of blades or vanes adapted to rotate about a substantially vertical axis, and supported in a frame or super-structure above the fuselage, may be substituted for the wings or planes as the supporting surface of the aeroplane, in the well known manner.

Landing wheels 18 are provided preferably located approximately below the centre of gravity of the machine, with the weight of the engine 8, fuel tank and luggage approximately immediately above them, thereby relieving the framework of the craft from a large amount of strain during landing and also when resting on the ground. These wheels 18 may be carried upon suitably sprung cantilever arms 19 projecting from opposite sides of the fuselage or body of the aeroplane.

The invention may also be readily applied to a flying boat type of aeroplane or to an amphibian machine intended to land or take off from both land or water. In this case an appropriately shaped hull of a flying boat would take the place of the fuselage or body of the aeroplane described above. The openings to the passenger compartment would be arranged sufficiently above the water line, when the machine was at rest on the water. The doors may also be arranged to be watertight when closed. The arrangement would provide the high propeller clearance which is essential to a craft adapted to land on or take off from water.

The roof of the passenger cabin forming the front end of the top of the fuselage preferably curves downwards forwardly so that its front edge joins the upper edge of the frame of the window 4, which window is preferably of arcuate outline thereby providing an easy wide angle of vision for the pilot free from optical distortion. The said roof also merges laterally downwards into the windows 5 so that the said roof, windows and lower parts of the sides of the cabin are substantially in curvilinear continuity. The root or rear end of the shaft housing 14 is shaped to flare or merge smoothly into the roof of the cabin as at 14a and as shown in Fig. 3 such housing preferably diminishes progressively in width forwardly to reduce head resistance and also to minimize the amount of structure immediately in rear of the hub of the propeller. It will be appreciated that the diameter of the front end of the housing 14 need only be slightly greater than that required for the front bearing 14a so that the displacement of air due to the propeller's action is not impeded to the extent which frequently arises with some forms of aeroplanes where the propeller hub is on the axis of and close to the nose of the fuselage. In my present invention the pilot's and passenger's, or luggage compartment can be brought forward quite close to the propeller without loss in efficiency as there is no occasion to provide an exaggeratedly tapered lengthy nose to the fuselage where it is required to minimize head resistance at the axis of and above the hub of the propeller.

It will be seen that the vision and accommodation provided for the pilot and passenger, or passengers, can by means of my invention be equivalent and similar to that provided on private motor road vehicles. Likewise a similar result as regards convenience in getting into and out of the machine is obtained, the doors 2 being situated in substantially the same position as the doors of a private motor road vehicle when the machine is on the ground, this result depending to a large extent on the absence of obstructions to the passengers due to engine or propeller shaft. In fact, the forward end of the fuselage has many of the characteristics of a modern private motor road vehicle. To obtain the maximum advantage of the proposed method of arranging the propeller and its shaft, the rudder 20 is shaped to lie substantially in continuity with the rearward convergence of the sides and top and bottom of the fuselage as shown in the drawing, whilst in common with the ailerons or elevators 21 of the tail 22 the front edges thereof are as shown substantially semi-circular, their axes of oscillation being on the centres of curvature of such front edges.

If desired the pilot and a passenger can be seated tandem fashion or two or more pairs of seats can be provided, the seats being arranged either side of the vertical plane containing the axis of the propeller shaft.

Machines according to this invention enable an unobstructed cabin space to be obtained allowing any convenient arrangement of seating accommodation. They also provide an exceptional degree of comfort for the passengers and render air travel much more pleasant.

I claim:—

1. In a tractor aeroplane, a fuselage, a nose end of said fuselage formed in streamline continuity with the body of the fuselage and constructed and adapted to substantially wholly constitute a cabin for a pilot and at least one passenger or luggage, a propeller shaft extending above the passenger compartment and in rear thereof into the upper part of the fuselage, and forwardly to a point above the front end of the said nose, a tubular housing accomodating the front end of the propeller shaft and extending forwardly from the top of said fuselage, and also merging into the top of the fuselage in substantially streamline continuity, a lower forwardly extended part of said cabin being disposed immediately beneath said housing, and a window joining the front edge of said top of the cabin with the rear upper edge of said lower forwardly extended part of said cabin.

2. In a tractor aeroplane, a fuselage, a nose in streamline continuity with and forming the closed front end of the fuselage, a window with side and front vision forming a step joining the front end of the top of the fuselage and an inner end of said nose, a central longitudinal propeller shaft extending in front and rear of and above said window, a strut upstanding from the front end of the nose and supporting the front end of the propeller shaft, an engine in the upper part of the fuselage receiving the rear end of said shaft, a longitudinal tubular housing enclosing the part of the shaft extending beyond the fuselage, said housing being joined at its front end to said strut and merging in substantially streamline continuity at its rear end into the top of the fuselage, and passenger seating and leg room in the nose entirely beneath the shaft and in front of said engine.

JAMES MARTIN.